April 19, 1955 E. E. PACKARD 2,706,537
BRAKE RIGGING SAFETY SUPPORT
Filed Nov. 16, 1953 2 Sheets-Sheet 1
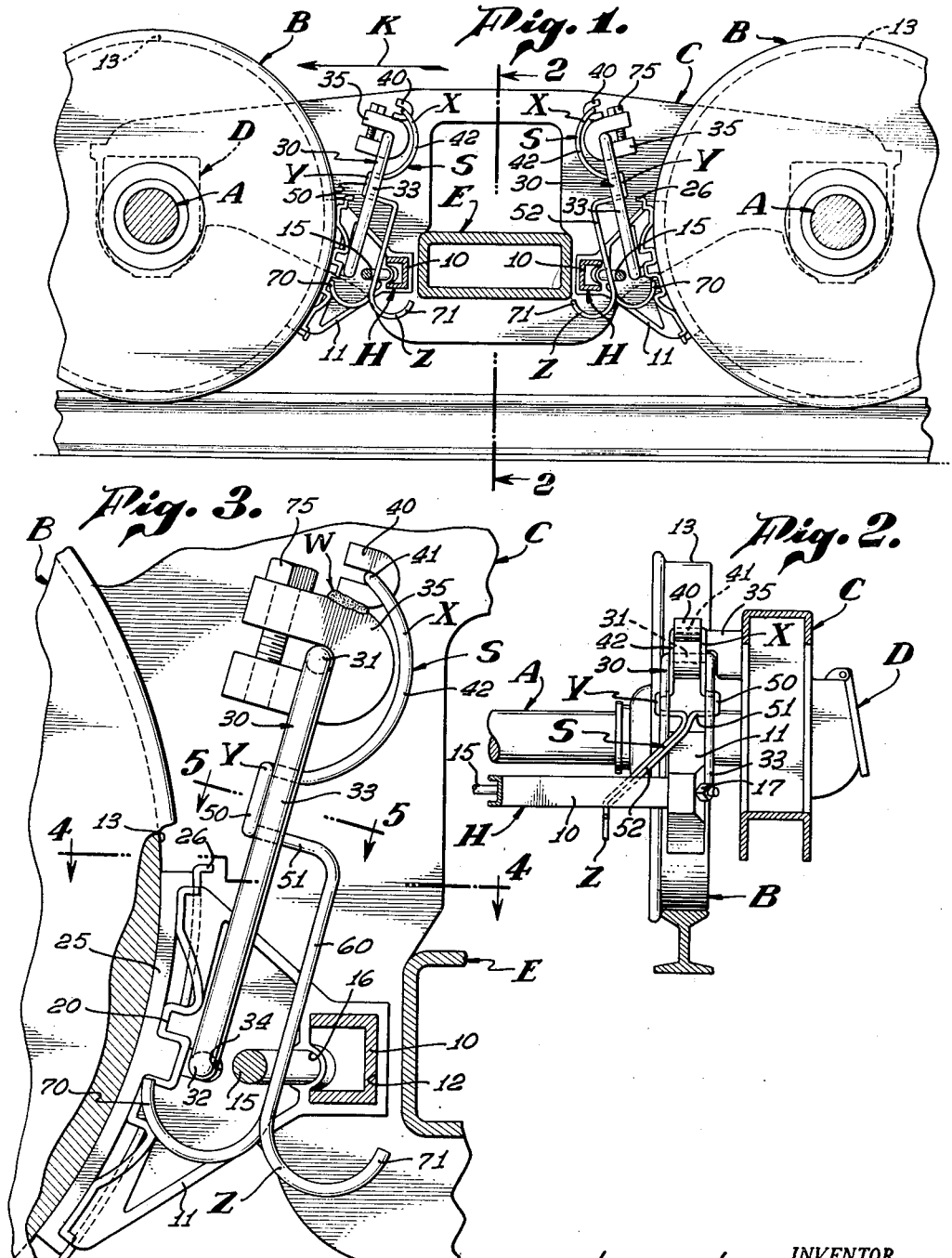
INVENTOR.
ELON E. PACKARD,
BY
AGENT.

April 19, 1955     E. E. PACKARD     2,706,537
BRAKE RIGGING SAFETY SUPPORT
Filed Nov. 16, 1953     2 Sheets-Sheet 2
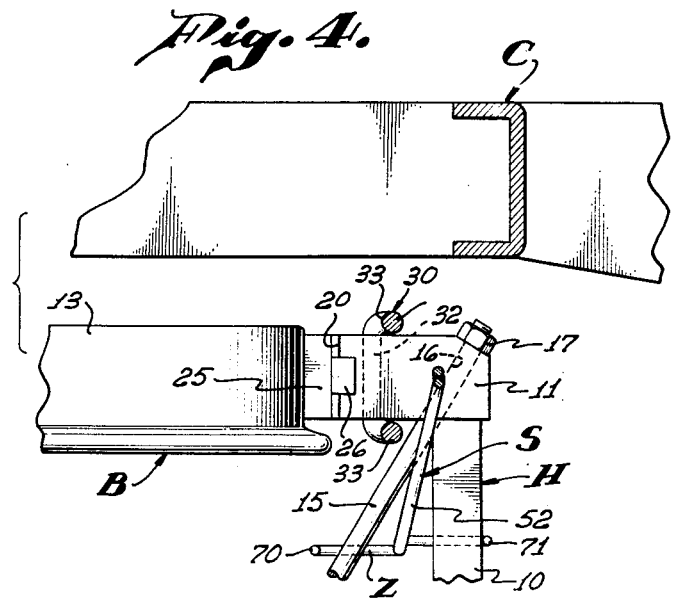
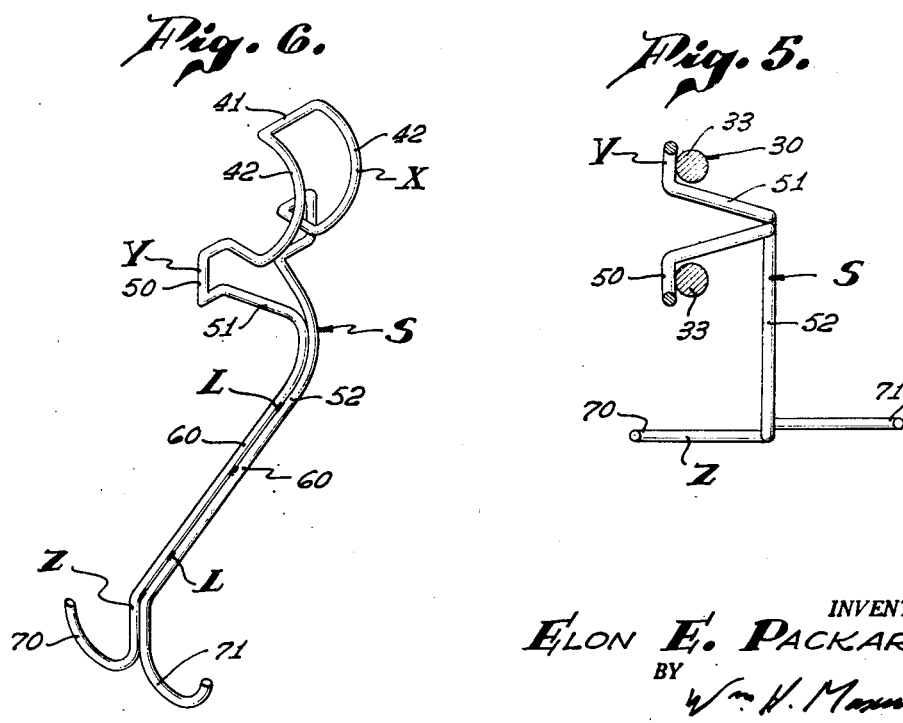
INVENTOR.
ELON E. PACKARD,
BY
AGENT.

United States Patent Office 2,706,537
Patented Apr. 19, 1955

2,706,537

BRAKE RIGGING SAFETY SUPPORT

Elon E. Packard, Los Angeles, Calif.

Application November 16, 1953, Serial No. 392,141

9 Claims. (Cl. 188—210)

This invention relates to railway rolling stock and is more particularly concerned with a new and novel brake rigging safety support.

Railroads for many years have experienced serious wrecks and derailments due to brake rigging failure, when the said rigging becomes damaged or disengaged and drops down and under the wheels of the train, or when the rigging becomes wedged in a frog or switch along the track, either of which may result in damage to both property and lives.

Conventional brake rigging on railroad cars and equipment includes a number of rods, levers, brake beams, brake beam hangers, brake shoes and brake shoe keys. Most of these related parts are fastened together with key-bolts, cotter keys, and/or regular bolts and nuts which, in normal service, are subjected to severe strains and vibrations, with the result that brake beam and hangers become broken. Also, brake shoe keys work out of place or break and allow the brake shoe to become displaced and fall to the ground, in which case there is nothing to prevent the brake beam from becoming separated from the hanger, thereby leaving it unsupported to fall to the ground or beneath the wheels of the truck, unless it is supported by a safety device.

Heretofore, there have been many and various types of safety devices developed to support and carry the brake rigging in case of rigging failure. Such devices have generally been characterized by a plurality of separable sections applied to the truck and to the rigging by means of bolts, cotter keys, rivets and the like, which members, being subject to the same vibrations and strain as the brake rigging, become broken and lost or displaced, and in numerous instances when a brake rigging failure occurs, the safety device has previously failed, with the result that the brake rigging is free to fall.

It is an object of the present invention to provide a safety support for the brake rigging of a railway truck that is simple and dependable and which is not subject to failure.

Another object of the present invention is to provide a safety support for the purpose described which is easy to install and which can be easily and quickly replaced.

Still another object of the invention is to provide a safety hanger of the character referred to that will not alter or otherwise affect the normal operation of the structure to which it is applied.

It is still another object of the invention to provide a unitary structure which is not subject to becoming lost or displaced.

Another object of the present invention is to provide a unitary safety hanger for brake rigging on a railway truck that is both inexpensive and easy of manufacture.

The safety support provided by the present invention inclues, generally, an elongate vertically disposed member having an upper portion carried by the frame of the truck, a middle portion with fingers engageable with the brake beam hanger and a lower portion with hooks engageable with the compression beam and tension rod of the brake beam.

The various objects and features of my invention will be fully understood from the following detailed description of a typical preferred form and application of my invention, throughout which description reference is made to the accompanying drawings, in which:

Fig. 1 is a sectional view through the bolster of a four-wheeled truck taken longitudinally of the truck showing the safety support provided by the present invention. Fig. 2 is a transverse sectional view taken as indicated by line 2—2 on Fig. 1. Fig. 3 is an enlarged detailed view of a portion of Fig. 1. Fig. 4 is a sectional view taken substantially as indicated by line 4—4 on Fig. 3. Fig. 5 is a transverse sectional view of a portion of the structure shown in Fig. 3 and taken substantially as indicated by line 5—5 on Fig. 3. Fig. 6 is a perspective view of the safety support provided by the present invention and removed from the brake rigging.

The ordinary or conventional railway car truck is characterized by a pair of like axles A extending transversely of the railway track, each truck including a pair of rail engaging wheels B and a pair of like elongate frame members C at each side of the truck extending between and supported by the ends of the axles and adapted to maintain the axles in fixed parallel spaced relationship, the said frame members being located outward of the wheels B to extend longitudinally of the track, and being provided with suitable journal boxes D at their ends to receive the end of the axles A. An elongate beam or bolster E extends transversely of the truck to occur between and parallel with the said axles, the ends of the bolster E being rigidly secured to the frame members midway between their ends and providing a suitable support for the frame and/or the body of the car (not shown).

The ordinary car truck further includes suitable like braking mechanisms for each of the pairs of wheels supporting the truck. Since the braking mechanisms are alike for each of the pairs of wheels, I will restrict this disclosure to the braking mechanism engageable with the forward or leading wheels of the truck, shown in Fig. 1, the direction of travel being indicated by the arrow K.

The ordinary braking mechanism is commonly referred to as brake rigging and includes, generally, a brake beam H extending transversely of the truck to occur between the truck bolster E and its related axle A and wheels. Each brake beam H includes, an elongate rigid compression beam 10, brake heads 11 having beam receiving sockets 12 therein, engageable on the ends of the compression beam to occur adjacent to rail engaging surfaces 13 of the wheels D. An elongate tension rod 15 is fixed to and extends between the brake heads 11 to occur in the same horizontal plane as the compression beam, and is adapted to maintain the heads 11 in engagement with the compression beam 10.

A suitable spacer or spreader (not shown) is provided between the compression beam 10 and the tension rod 15 midway between their ends so that the brake beam H is, in effect, a truss beam. The tension rod 15 is held in spaced relationship with the rigid compression beam 10 where the spreader occurs, and is inclined outwardly in both directions therefrom to converge with the beam at the brake heads 11.

The ends of the tension rod 15 are passed through suitable openings 16, provided in each of the heads 11, and have retaining nuts 17 screw-threaded thereon to maintain the rod in tension and thereby maintain the heads 11 engaged on the ends of the compression rod 10.

Each brake head 11 is characterized by a forwardly opening substantially arcuate face 20 opposing the periphery 13 of its related wheel B, and is adapted to receive and hold a suitable wheel-engaging brake shoe 25. The shoe 25 is releasably retained in the brake head 11 by a suitable pin 26, which pin is slidably inserted into spaced registering openings provided in the head and in the shoe.

The brake rigging thus far described is suspended at each of its ends by a forwardly opening rectangular loop-like hanger 30 having vertically spaced parallel, horizontally disposed top and bottom rails 31 and 32, respectively, and laterally spaced substantially vertically disposed parallel side rails 33. The top and bottom rails 31 and 32 are parallel to the longitudinal axis of the compression beam and extend in a plane transverse of the track.

The top rail 31 of the hanger 30 is releasably engaged in a forwardly opening, horizontally disposed, U-shaped bracket 35, projecting laterally inward from the inside face of the frame C of the truck, and terminating above the brake head 11. The bottom rail 32 of the hanger is engaged in a horizontally disposed transverse hanger-receiving recess or opening 34, provided in a forwardly opening shoe-receiving face 20 of the brake head 11, and is retained therein by the brake shoe 25 and the shoe-retaining pin 26 referred to above.

From the above it will be apparent that the lower ends of the parallel side rails 33 of the hanger 30, that engage or join the bottom rail 32, are spaced laterally of each other and occur at opposite sides of the brake head 11 to project upwardly therefrom, while the upper ends of the rails 33 occur at opposite sides of the U-shaped hanger bracket 35 carried by the frame, where they join or meet the ends of the top rail 31.

The ordinary or conventional actuating means for the brake rigging (not shown) is connected to the bolster E midway between the side frames C of the truck by suitable links, levers, and the like, and engages the spacer occurring between compression beam 10 and tension rod 15, referred to above.

It is to be understood that the various elements referred to and described above can vary widely in form and construction, and that the particular structure described is only typical of the general construction, dispositioning and relationship of elements that is present in the ordinary or conventional railway truck.

The safety support that applicant provides is adapted to be incorporated in a conventional railway truck as set forth above, and is adapted to adequately hold and support the various elements of the brake rigging should any one, or more, of the elements therein become disengaged, as by loss of one or more of the various fastening means therein, or as by breakage of any of the elements therein.

The safety support S, as provided by the present invention, is an elongate, substantially vertically disposed unitary structure, characterized by a head portion X engageable with and supported by a suitable clip 40 provided on the hanger bracket 35 on side frame C, a middle, or body portion Y depending from the head portion to occur below the bracket 35 and engageable with the hanger 30 supporting the brake head 11 and carried by the bracket 35, and a bottom, or catcher portion Z depending from the said middle portion Y and engageable with the compression beam 10 and tension rod 15 of the brake beam H.

The safety support S, in applicant's preferred construction, is formed of a single length of steel rod, or the like, round in cross section and shaped or bent to form the various sections referred to above, which will be clearly set forth hereinafter.

A forwardly opening horizontally disposed U-shaped clip 40 is shown as provided on the upper or top side of the forwardly opening U-shaped hanger bracket 35 projecting from the frame C of the truck, and is permanently fixed thereto as by welding W, or the like. It is to be understood that the clip 40 could, if desired, or circumstances required, be supported by the frame C, independent of the bracket 35.

The head portion X of the safety support S, is characterized by a horizontally disposed header 41 engageable in the U-shaped clip 40 from its forward or open end. A pair of laterally spaced, arcuate bars 42 extends rearwardly and downwardly from the ends of the header 41 and around the back, or closed side, of the forwardly opening U-shaped hanger bracket 35. The bars 42 continue around said bracket to occur beneath the bracket and extend between the laterally spaced depending side rails 33 of the hanger 30 carried by the bracket, join the middle, or body portion Y of the support.

The middle or hanger-engaging body portion Y of the safety support S, is, in effect, a continuation of the arcuate bars 42 of the top section A, and is characterized by a pair of laterally projecting, oppositely faced, wings or fingers 50 at the lower ends of the spaced bars 42 of the top section. The fingers 50 are adapted to overlie and engage the side rails 33 of the hanger 30 at the forward or front side of the hanger and at a point intermediate the hanger bracket 35 and brake head 11. The laterally projecting fingers 50 of the middle portion are provided with recurved extensions 51 that project laterally inward and then rearward between the said rails 33 of the hanger, where they converge at a point rearward of the hanger 30 and above the brake head 11 to join the lower catcher portion Z of the support.

The lower catcher portion Z of the safety support S is formed by continuations 60 of the recurved extensions 51 of the middle portion Y, and is characterized by an elongate leg 52 formed by the continuations 60 and depending from the middle portion Y. The leg 52 of the lower portion Z is angularly related to the middle body portion Y to occur inward of the brake head 11 and to pass between the converging compression beam 10 and tension rod 15. The continuations 60 of the middle portion Y forming the leg 52 of the support S are adjacent and parallel to each other throughout the length of the leg, and are secured together in fixed relationship as by welding L, or the like.

The lower terminal ends of the leg 52, formed by the continuations 60 of the middle body portion, are bent to form suitable brake beam engaging hooks, one extension 60 having a forwardly projecting hook 70 adapted to occur beneath the tension rod 15, and the other extension 60 having a rearwardly projecting hook 71 adapted to occur beneath the compression beam 10.

With the safety support S, as provided by the present invention, it will be apparent that, should the brake shoe key 26 of the brake assembly break or become displaced and the brake shoe 25 lost, the bottom rail 32 of the hanger 30 will be maintained in engagement with the hanger-receiving recess in the brake head 11 by the finger 50 of the middle, or hanger-engaging body portion Y of the support.

It will also be apparent that, should the tension rod 15 become slack or disengaged from the brake head 11, which would result in displacement of the compression beam 10 from the brake head 11, the various loose and disengaged elements would be caught and supported by the hooks 70 and 71 provided at the lower end of the lower portion Z of the support, and so would not drop onto the track or the ground.

In the particular case illustrated I have shown a lock bolt 75, engaged through the U-shaped hanger bracket 35 outward of the top rail 32 of the hanger 30, and adapted to maintain the hanger 30 engaged in the bracket.

It will be apparent that, should the lock bolt 75 in the bracket 35 become displaced or lost, the hanger 30 will be maintained in working engagement with the bracket by the fingers 50 on the middle body portion Y of the support, which fingers positively limit excessive forward movement of the hanger relative to the bracket 35 and the brake head 11.

It is also to be noted that, with the safety support that I have provided, the brake beam assembly can be disassembled without dropping the various elements thereof to the ground, which feature is highly significant, since it makes possible quick repair of the brake rigging with a minimum of effort.

The lower catcher portions Z of the safety supports S of my invention must be inclined so that their lower end portions will occur inward of the brake heads 11 and pass between the compression beam 10 and the tension rod 15. For these reasons I provide a left-handed and a right-handed safety support S for each brake rigging assembly, each having its lower end portion Z inclined inwardly towards the center of the truck and brake beam.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A safety support of the character described including, a head portion having a horizontally disposed header, laterally spaced arcuate arms depending from the ends of the header, a middle body portion carried by the arms to occur below the header and having like oppositely faced, laterally projecting hanger engaging fingers, a bottom catcher portion carried by and depending from the body portion and having a rearwardly projecting, upwardly opening beam engaging hook and a forwardly projecting upwardly opening rod engaging hook.

2. In combination, a railway truck having a side frame, a horizontally disposed forwardly opening U-shaped hanger bracket on the frame, a loop-like hanger engageable in the bracket and having substantially vertically disposed laterally spaced side rails depending from the bracket, a clip secured to the frame above the bracket, a safety support including, a head portion having a horizontally disposed header engaged in and carried by the clip, laterally spaced arcuate arms depending from the ends of the header to occur behind the bracket, a middle body portion carried by the arms to occur below the bracket rearward of the hanger and having like, oppositely faced, laterally projecting fingers engageable with the front of the side rails of the hanger, and a bottom catcher portion carried by the middle portion to depend therefrom and provided with oppositely disposed hooks at its lower end.

3. In combination, a railway truck having a side frame, a loop-like brake hanger having vertically disposed, laterally spaced side rails and horizontally disposed vertically spaced top and bottom rails, a horizontally disposed forwardly opening U-shaped bracket on the frame receiving the said top rail of the hanger, a brake beam assembly having, a brake head engaged on and carried by the said bottom rail of the hanger, a horizontally disposed compression beam and a tension rod carried by the brake head to project laterally inward therefrom and extending transverse the truck, a horizontally disposed U-shaped clip secured to the top of the bracket, and an elongate vertically disposed unitary safety support including, a head portion having a horizontally disposed header engaged in and carried by the clip, laterally spaced arcuate arms depending from the ends of the header to occur behind the bracket, a middle body portion carried by the arms to occur below the bracket rearward of the hanger and having like, oppositely faced, laterally projecting fingers engageable with the front of the laterally spaced rails of the hanger, and a catcher portion carried by the middle portion to depend therefrom and provided with like oppositely disposed upwardly opening break beam engaging hooks.

4. In a railway truck having a side frame, a horizontally disposed forwardly opening U-shaped hanger bracket on the frame, a loop-like hanger engageable in the bracket, a U-shaped clip secured to the top of the bracket, a safety support including, a head portion having a horizontally disposed header engaged in and carried by the clip, laterally spaced arcuate arms depending from the ends of the header to occur behind the bracket, a middle body portion carried by the arms to occur below the bracket rearward of the hanger and having like, oppositely faced, laterally projecting fingers engageable with the front of the hanger, and a bottom catcher portion carried by and depending from the body portion and having a rearwardly projecting upwardly opening hook below the compression beam and adapted to catch the compression beam and support the brake beam.

5. In a railway truck having a side frame, a horizontally disposed forwardly opening U-shaped hanger bracket on the frame, a loop-like hanger engageable in the bracket, a clip secured to the frame above the bracket, a safety support including, a head portion having a horizontally disposed header engaged in and carried by the clip, laterally spaced arcuate arms depending from the ends of the header to occur behind the bracket, a middle body portion carried by the arms to occur below the bracket rearward of the hanger and having like, oppositely faced, forwardly and laterally projecting fingers projecting through the hanger and engageable with the front of the hanger, and a bottom catcher portion carried by and depending from the body portion and having a forwardly projecting upwardly opening hook below the tension rod and adapted to catch the tension rod and support the brake beam.

6. In a railway truck having a side frame, a horizontally disposed forwardly opening U-shaped hanger bracket on the frame, a loop-like hanger engaged in the bracket to depend therefrom, a clip secured to the frame above the bracket, a safety support including, a head portion having a horizontally disposed header engaged in and carried by the clip, laterally spaced arcuate arms depending from the ends of the header to occur behind the bracket, a middle body portion carried by the arms to occur below the bracket rearward of the hanger and having like, oppositely faced, laterally projecting fingers engageable with the front of the hanger, and a bottom catcher portion carried by and depending from the body portion and having a rearwardly projecting upwardly opening hook below the compression beam and a forwardly projecting upwardly opening hook below the tension rod, the said hooks being adapted to catch and support the brake beam assembly.

7. A railway truck including, a pair of like parallel side frames, a brake beam between the side frames and including, a horizontally disposed compression beam extending between the side frames transverse of the truck, like forwardly facing brake heads at each end of the compression beams, a tension rod secured to and extending between the brake heads forward of the compression beam and adapted to maintain the heads on said beam, a forwardly opening horizontally disposed U-shaped hanger bracket on each side frame above the brake heads, a pair of elongated loop-like hangers each having laterally spaced vertically disposed side rails and horizontally disposed vertically spaced top and bottom rails, the top rails being engaged in the brackets and the bottom rails being engaged in notches in the forward face of the brake heads, a forwardly opening horizontally disposed U-shaped clip on each side frame above the bracket, an elongate unitary safety support carried by each of said clips to depend therefrom, each support having a head portion having a horizontally disposed header engageable in said clip, laterally spaced arcuate arms depending from the ends of the header to occur behind and engageable with the back of the bracket to maintain the header engaged therein, a middle body portion below the bracket and carried by the arms and having like oppositely faced, laterally projecting fingers located in front of the hanger and overlying the side rails of the hanger and adapted to maintain the top and bottom rails of the hanger engaged in the bracket on the frame and the notch in the brake head and a lower catcher portion depending from the middle body portion and adapted to engage and occur below and support the tension rod and compression beam.

8. In combination, a railway truck including, a pair of like parallel side frames, a brake beam between the side frames and including, a horizontally disposed compression beam extending between the side frames transverse of the truck, like forwardly facing brake heads at each end of the compression beams, a tension rod secured to and extending between the brake heads forward of the compression beam and adapted to maintain the heads on said beam, a forwardly opening horizontally disposed U-shaped hanger bracket on each side frame above the brake heads, a pair of elongated loop-like hangers each having laterally spaced vertically disposed side rails and horizontally disposed vertically spaced top and bottom rails, the top rails being engaged in the brackets and the bottom rails being engaged in notches in the forward face of the brake heads, a forwardly opening horizontally disposed U-shaped clip on each side frame above the bracket, an elongate unitary safety support carried by each of said clips to depend therefrom, each support having a head portion having a horizontally disposed header engageable in said clip, laterally spaced arcuate arms depending from the ends of the header to occur behind and engageable with the back of the bracket to maintain the header engaged therein, a middle body portion carried by the arms to occur below the bracket and having like oppositely faced fingers projecting between the side rails of the hanger to occur at and engage the front side thereof to maintain the top and bottom rails of the hanger engaged in the bracket on the frame and the notch in the brake head.

9. A railway truck including, a pair of like parallel side frames, a brake beam between the side frames and including, a horizontally disposed compression beam extending between the side frames transverse of the truck, like forwardly facing brake heads at each end of the compression beams, a tension rod secured to and extending between the brake heads forward of the compression beam and adapted to maintain the heads on said beam, a forwardly opening horizontally disposed U-shaped hanger bracket on each side frame above the brake heads, a pair of elongated loop-like hangers each having laterally spaced vertically disposed side rails and horizontally disposed vertically spaced top and bottom rails, the top rails being engaged in the brackets and the bottom rails being engaged in notches in the forward face of the brake heads, a forwardly opening horizontally disposed U-shaped clip on each side frame above the bracket, an elongate unitary safety support carried by each of said clips to depend therefrom, each support having a head portion having a horizontally disposed header engageable in said clip, laterally spaced arcuate arms depending from the ends of the header to occur behind and engageable with the back of the bracket to maintain the header engaged therein, a middle body portion carried by the arms to occur below the bracket and having like forwardly and then laterally projecting fingers extending between the side rails of the hanger to engage the front side thereof and adapted to maintain the top and bottom rails of the hanger engaged in the bracket on the frame and the notch in the brake head, and a bottom catcher portion having a leg carried by and depending from the middle portion to occur inward of the brake head and between the compression beam and tension rod, a forwardly projecting upwardly opening hook on the lower end of the leg beneath the tension rod, and a rearwardly projecting upwardly opening hook below the compression beam, said hooks adapted to catch and support the brake beam.

References Cited in the file of this patent

UNITED STATES PATENTS

| | | |
|---|---|---|
| 2,069,353 | Busch | Feb. 2, 1937 |
| 2,165,864 | Light | July 11, 1939 |
| 2,267,851 | Van Sweringen | Dec. 30, 1941 |
| 2,283,846 | Busse | May 19, 1942 |